United States Patent [19]

van den Broek

[11] 3,927,046

[45] Dec. 16, 1975

[54] NOVEL 11,11-ALKYLIDENE STEROIDS

[75] Inventor: Albertus Joannes van den Broek, Oss, Netherlands

[73] Assignee: Akzona Incorporated, Asheville, N.C.

[22] Filed: Dec. 3, 1973

[21] Appl. No.: 420,823

[30] Foreign Application Priority Data

Dec. 9, 1972 Netherlands.................. 7216767
Nov. 15, 1973 Netherlands.................. 7315704

[52] U.S. Cl. ...... 260/397.3; 260/397.45; 260/397.5
[51] Int. Cl.² ............................................ C07J 1/00
[58] Field of Search................. 260/397.3, 397.45

[56] References Cited
UNITED STATES PATENTS
3,527,778   9/1970   Baran et al. .................. 260/397.45

FOREIGN PATENTS OR APPLICATIONS
912,037   12/1962   United Kingdom............ 260/397.45

*Primary Examiner*—Elbert L. Roberts
*Attorney, Agent, or Firm*—Francis W. Young; Philip M. Pippenger; Hugo E. Weisberger

[57] ABSTRACT

The invention relates to novel 11,11-alkylidene steroids of the estrane and (19-nor-)pregnane series having a double bond starting from carbon atom 5, the alkylidene group in 11-position having the formula

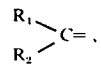

wherein $R_1$ and $R_2$ are hydrogen or an alkyl group having 1–2 C-atoms, and to processes for their preparation.

The novel compounds have very interesting biological activities, such as anabolic, androgenic, estrogenic, progestative, anti-androgenic, anti-oestrogenic, ovulation-inhibiting and gonad-inhibiting activities.

3 Claims, No Drawings

NOVEL 11,11-ALKYLIDENE STEROIDS

This invention relates to novel 11,11-alkylidene steroids and more specifically, it relates to novel 11,11-alkylidene steroids having a double carbon-carbon bond starting from carbon atom 5 and to processes for their preparation.

In the British patent specification No. 912,036 a description is given of 11,11-methylene-5α-steroids, and in particular of 11,11-methylene-5α-spirostanes, -5α-pregnanes and -5α-androstanes. Said compounds are prepared by departing from the corresponding 11β-hydroxy-11α-methyl-5α-steroids and dehydratation and isomerisation of same with an acidic reagent. The 11β-hydroxy-11α-methyl-5α-steroids are prepared from the corresponding 11-oxo-steroids by a reaction with methyl-magnesium-halide, as disclosed in the British patent specification No. 912,035.

Of these known 11,11-methylene-5α-steroids it is disclosed that the 5α-spirostane- and the 5α-pregnane-compounds specifically mentioned are useful as intermediates in the preparation of biologically active 11,11-methylene-derivatives and that the 5α-androstane-compounds specifically mentioned are valuable for their androgenic and anabolic properties.

A new group of 11,11-alkylidene-steroids having a double bond terminating in 5- position has now been prepared, the compounds of which possess very valuable biological properties.

Thus, the invention relates to novel 11,11-alkylidene-$\Delta^4$ (or $\Delta^5$ or $\Delta^{5(10)}$ or A-aromatic)-steroids, the alkylidene group in 11-position having the formula

wherein $R_1$ and $R_2$ are hydrogen or an alkyl group having 1-2 C-atoms.

More particularly, the invention relates to novel compounds of the type indicated above, having the formula

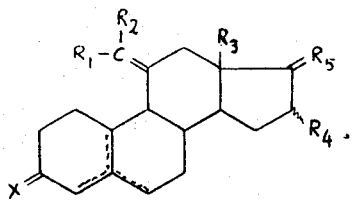

wherein
$R_1$ and $R_2$ have the meanings as given hereinbefore, and are preferably hydrogen,
$R_3$ is an alkyl group having 1-4 C-atoms, preferably methyl or ethyl,
$R_4$ is hydrogen or a free, esterified or etherified hydroxy group,
$R_5$ is oxygen, $\alpha H(\beta R_6)$ or $\alpha R_7(\beta R_6)$, wherein $R_6$ is a free, esterified or etherified hydroxy group and $R_7$ is a saturated or unsaturated alkyl group having 1-4 C-atoms,
X is $H_2$, oxygen or $H(R_8)$, wherein $R_8$ is a free, esterified or etherified hydroxy group, and
a double bond is present starting from carbon atom 5, or the formula

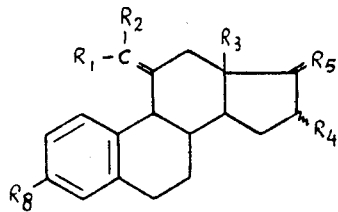

wherein
$R_1$, $R_2$, $R_3$, $R_4$, $R_5$ and $R_8$ have the meanings as given hereinbefore, or the formula

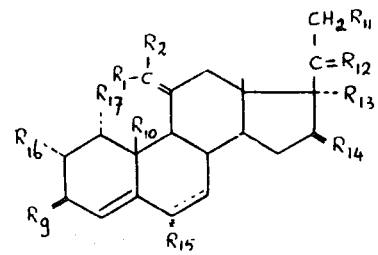

wherein
$R_1$ and $R_2$ have the meanings as given hereinbefore,
$R_9$ and $R_{12}$ are oxygen or $H(R_8)$, wherein $R_8$ is a free, esterified or etherified hydroxy group,
$R_{10}$ is hydrogen or methyl,
$R_{11}$ is hydrogen, $R_8$ or halogen, preferably F or Cl,
$R_{13}$ is hydrogen, $R_8$ or methyl,
$R_{14}$ is $H_2$, H(alkyl 1-4 C) or methylene,
$R_{15}$ is hydrogen, methyl or halogen, preferably F or Cl,
$R_{16}$ and $R_{17}$ are hydrogen or form together a methylene group, and a double bond may be present between the carbon atoms 6 and 7.

The compounds according to the present invention prove to possess very valuable anabolic, androgenic, estrogenic, progestative, anti-androgenic, anti-estrogenic, ovulation-inhibiting and gonad-inhibiting activities. Further, said compounds are of interest for their peripheric antifertilization activities, such as e.g. the contraceptive influence on ovum transport and/or on cervical mucus and the anti-nidation activity. Furthermore the novel compounds are useful starting products for the preparation of biologically active 11-alkyl-steroids, into which they may be converted by reduction of the exocyclic double bond at the position 11.

The 11,11-alkylidene compounds having an aromatic A-ring are particularly useful for their estrogenic and their cholesterolaemic activity. The 11,11-alkylidene compounds of the 17α-alkylated-estrene type are particularly useful for their ovulation-inhibiting and their progestative activity. The 11,11-alkylidene compounds of the 19-nor-testosterone type, such as e.g. 11,11-methylene-19-nor-testosterone phenylpropionate, have valuable androgenic activity. The 11,11-alkylidene compounds of the (19-nor-)pregnane series are particularly useful for their strong progestative activity with minor oestrogenic and androgenic activities. The 1,2-methylene-11,11-alkylidene compounds of the (19-nor-)pregnane series are particularly useful for their anti-androgenic activity.

The novel compounds may be prepared by starting from an 11-oxo-steroid, converting the 11-oxo-group thereof into the 11,11-alkylidene group in a way known per se, while other vulnerable oxo-groups, if present, are protected temporarily and subsequently introducing the substituents desired elsewhere in the molecule and not yet present therein by methods known per se.

For the preparation of the novel 11,11-alkylidene-steroids of the (19-nor-)pregnane series the starting material is usually a 3,11-dioxo-Δ⁴-steroid of said series or a corresponding 3-hydroxy-11-oxo-Δ⁵-or 3-acyloxy-11-oxo-Δ⁵-steroid, the 3-hydroxy-Δ⁵- or 3-acyloxy-Δ⁵-group of which is converted afterwards into the 3-oxo-Δ⁴-group in the usual way, e.g. by Oppenauer oxidation.

The conversion of the 11-oxo-group into the 11,11-alkylidene-group may be carried out, for example, by reacting the 11-oxo-steroid with a silane having the general formula:

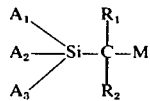

wherein $A_1$, $A_2$ and $A_3$ indicate an alkyl- or an aryl radical, for example a methyl-, ethyl- or phenyl-group, $R_1$ and $R_2$ have the meaning as mentioned above, and M is a magnesium-halide-radical, for example —MgCl, or lithium, whereafter the β-silyl-carbinol thus formed is decomposed in an alkaline or acidic medium.

The conversion of a carbonyl-group into an alkylidene-group by reacting with a silane mentioned above has been described i.a. in an article by Chan, T.H., et al. in "Tetrahedron Letters", No. 14 (1970), pages 1137–1140. Reference is also made to "Journal of Organic Chemistry", 33 (1968), pages 782, ff. During the reaction of the trialkyl- or triaryl-silylsubstituted organometal-compound with the carbonyl group, the β-silyl substituted M-alkoxide or the β-silyl-carbinol is formed as an intermediate, which is easily decomposed to the olefin desired under the influence of an acid or base.

In order to introduce the 11,11-methylene-group, the 11-oxo-steroid is brought in reaction with trialkyl- or triarylsilyl-methyl-magnesium-chloride, e.g. with trimethylallyl-methyl-magnesium-chloride, which is obtained by the reaction of magnesium with trimethylsilyl-methyl-chloride in a solvent, e.g. ether. From the reaction mixture the 11-hydroxy-trialkyl-(or-triaryl-)silyl-methyl-steroid may be isolated. Said compound is decomposed in a solvent, e.g. acetone or tetrahydrofuran, with the aid of an acid, e.g. hydrochloric acid, or of a base, e.g. sodium hydride or potassium-tert.butoxide, whereby the 11,11-methylene-steroid is obtained. In order to prepare an 11,11-ethylidene-steroid, an 11-oxo-steroid is reacted with trialkyl- or triaryl-silyl-ethyl-magnesium-chloride, e.g. trimethylsilyl-ethyl-magnesium-chloride, or with trialkyl- or triaryl-silyl-ethyl-lithium, e.g. trimethyl-silyl-ethyllithium.

For the preparation of the 11,11-alkylidene steroids from the 11-oxo-steroids a phosphorane having the general formula:

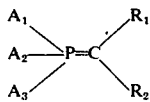

may be used as well, $A_1$, $A_2$, $A_3$, $R_1$ and $R_2$ having the same meanings as above (Wittig reagent). Preferably the triphenyl-phosphoryl-alkylidene-compounds are used.

Said phosphoranes are made by reacting a triaryl- or trialkyl-phosphine with an alkyl-halide, whereby the corresponding triaryl- or trialkyl-phosphonium-alkyl-halide is formed. The latter compound may be converted into the triaryl- or trialkyl-phosphoryl-alkylidene desired, under the influence of a base.

Since the latter compounds are not stable and since they are easily converted under the influence of air or of moisture, it is, however, preferred to prepare such compounds in situ and not to isolate same. According to the invention the reaction is therefore usually carried out by adding the 11-oxo-steroid or a solution thereof to a mixture of a trialkyl- or of a triarylphosphine and an alkyl-halide, together with a suitable base in the presence of a suitable organic solvent, under the exclusion of oxygen, for example under a nitrogen atmosphere.

As suitable bases the alkali-metal-compounds of aliphatic, aromatic or araliphatic hydrocarbons, e.g. butyl-lithium, phenyl-lithium or triphenylmethyl-sodium; alkyl-magnesium-halides, e.g. ethyl-magnesium-bromide; alkali-metal-amides, alkali-metal-alcoholates, and "dimsylsodium" (the reaction product of sodium-hydride and dimethyl-sulphoxide) may be indicated.

As solvents dimethyl-sulphoxide, aliphatic ethers, e.g. dimethyl-ether, diethyl-ether, dioxane or tetrahydrofuran, and aromatic hydrocarbons, e.g. benzene or toluene, are used.

The 11-oxo-group may also be converted into the 11,11-alkylidene-group by reacting the 11-oxo-steroid with a Grignard reagent, e.g. with methyl- or ethyl-magnesium-bromide or with the corresponding iodides, or with an alkyl-metal-compound, e.g. methyl-lithium or ethyl-lithium, and dehydrating the 11-alkyl-11-hydroxy-steroid thus obtained, or converting it into the 11-alkyl-11-halo-steroid, particularly the 11-alkyl-11-chloro- or the 11-alkyl-11-bromo-steroid, and dehydrohalogenating the latter. The dehydration may be effected by treating the 11-alkyl-11-hydroxy-steroid with an acid, e.g. formic acid or acetic acid, in the presence of traces of perchloric acid, or with another dehydrating agent, such as thionyl chloride. For the dehydrohalogenation of the 11-alkyl-11-halo-steroid e.g. an alkali-metal- or an alkaline earth-metal-carbonate, is used as a dehydrohalogenation agent, possibly in the presence of an alkali-metal-halide, such as lithium-bromide, or another base, such as collidine or potassium-hydroxide.

The 11-oxo-steroid may also be converted into the 11-11-alkyliden-steroid by an addition reaction with a lithium-alkyl-ether of thiophenol having the general formula:

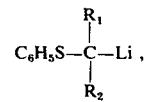

wherein $R_1$ and $R_2$ have the same meanings as mentioned above, and subsequent decomposition of the 11-hydroxy-11-phenyl-thioalkyl-steroid thus formed, after esterification of the hydroxy group to e.g. the acetate or the benzoate, under reducing conditions by means of lithium in liquid ammonia, thus forming the desired steroid (J.A.C.S., 94, No. 13 (1972), 4758–4759).

The substituents desired elsewhere in the end-products may be present in the starting steroid or may be introduced after the introduction of the 11,11-alkylidene group or substituents being already present in the starting steroid may be converted into the substituents desired in the end-products after the introduction of the 11,11-alkylidene group.

The substituent $R_3$ is preferably present in the starting 11-oxo-steroid. Examples of $R_3$ are the methyl-, ethyl-, propyl-, iso-propyl- and butyl-group. $R_3$ is preferably methyl or ethyl. A hydroxyl group in 16-position, if desired in the enproduct, is preferably already present as well in the starting steroid and is esterified or etherified, if so desired, after the introduction of the 11,11-alkylidene group.

In the compounds of the (19-nor-)pregnane series the substituent $R_{10}$ (H or $CH_3$) is preferably present in the starting 11-oxo-steroid. Preferably, the substituent $R_{14}$ is also present in the starting 11-oxo-steroid, i.e. position 16 is either unsubstituted ($R_{14} = H_2$) or substituted by methylene or by an alkyl group having 1–4 carbon atoms. In the last case the 16-substituent is methyl, ethyl, propyl, isopropyl, butyl or isobutyl and is preferably ethyl.

During the conversion of the 11-oxo-group into the 11,11-alkyliene-group, the oxo-groups in the position 3, 17 and/or 20, if present, are preferably protected against the influence of the alkylenation agent, e.g. by forming of a ketal, such as the ethylene ketal or dimethyl ketal, or of a thioketal, such as the dimethyl thioketal, or by forming of an enol-ether or an enamine. After the 11,11-alkylenation these protecting groups are removed again in the usual way, e.g. by hydrolysis with acid.

The hydroxy groups at positions 3, 16, 17, 20 and/or 21, if present, may be esterified or etherified, if so desired, before the 11,11-alkylenation reaction is carried out. If it is intended to prepare a final product having an etherified hydroxyl-group, it is usually advantageous in the alkylenation to start from a steroid, wherein the ultimately desired ether group is already present, e.g. a 3-methyl-ether group in a steroid having an aromatic A-ring. As a rule this cannot be realised for an ester-group the ester function being hydrolysed under the basic or acidic reaction conditions appearing in the alkylenation, thus obtaining an 11,11-alkylidene-steroid having a free hydroxyl-group. However, the protection of a hydroxyl-group in the form of an ester, e.g. the acetate or the benzoate, offers the possibility as yet to prepare a final product having a free hydroxyl-group. If required said hydroxyl-group may be esterified or etherified thereafter in order to prepare e.g. the phenyl-propionate or the cyclo-pentyl-ether.

The ether-group used for the protection of a hydroxyl-group may be the tert.-butyl ether- or the tetrahydropyranyl ether group; the protecting ester group may be carbonate, acetate, trimethyl acetate or benzoate.

For the preparation of an 11,11-alkylidene-3-desoxosteroid of the estrane series, either a corresponding 11-oxo-3-desoxo-steroid may be used as the starting material and said steroid is alkylenated at the position 11, or a corresponding 3,11-dioxo-steroid may be used as the starting material, the 3-oxo-group is protected e.g. by ketal formation, the 11-oxo-group is converted into the 11,11-alkylidene group and subsequently the oxygen function at the position 3 is removed according to a method known per se, e.g. by thioketalisation of the 3-oxo-group by means of a reaction with a mercaptane or a dithiol in the presence of $BF_3$ or of the etherate thereof or in the presence of zinc chloride, or of hydrochloric acid in the presence of a dehydrating agent, such as sodium sulphate, followed by reductively splitting off of the cyclic or non-cyclic 3-thio-ketal-group thus obtained, in an appropriate solvent, e.g. dioxane or tetrahydrofuran, with an alkali metal, e.g. lithium, in the presence of liquid ammonia or of a lower primary aliphatic amine, e.g. methyl-amine or ethyl-amine.

A 11,11-alkylidene steroid with an aromatic ring A is preferably prepared from a starting material already having an aromatic ring A. After the introduction of the 11,11-alkylidene group an aromatic ring A carrying a 3-methylether group may be converted to the 3-oxo-$\Delta^4$ group according to the Birch reduction method (reduction with an alkalimetal in liquid ammonia) and conversion of the $\Delta^{2,5(10)}$-3-enolether thus obtained by heating with diluted strong acid. Hydrolysis of the $\Delta^{2,5(10)}$-3-enolether at room temperature with a weak acid, e.g. acetic acid or oxalic acid, yields the 3-oxo-$\Delta^{5(10)}$)-compound.

The 17-substituents in the 11,11-alkylidene steroids of the estrane series, including the A-aromatic compounds may be present in the starting compounds for the 11,11-alkenylation reaction or may be introduced after the 11,11-alkenylation. The introduction after the alkenylation is preferred in the case when a saturated or unsaturated alkyl group is to be introduced in the 17α-position.

The introduction of a saturated or unsaturated alkyl group in the 17α-position is effected by reacting the 11,11-alkylidene-17-oxo-steroid, which may have been obtained by oxidising the corresponding 11,11-alkylidene-17β-hydroxy compound according to the Oppenauer method or with chromium trioxide, with a metal derivative of a saturated or an unsaturated aliphatic hydrocarbon.

The metal derivatives may be a Grignard compound, e.g. the magnesium bromide of the corresponding hydrocarbon, or an alkyl lithium compound. A special embodiment of the condensation reaction for the preparation of the 17-hydroxy-17-alkynyl compounds is the reaction of the 17-oxo-steroid with a triple bond unsaturated hydrocarbon in the presence of an alkali metal or an alkali metal compound, such as an alkali metal amide or -alcoholate, or with an alkali metal compound or an alkaline earth metal compound of a triple bond unsaturated hydrocarbon.

The 17-alkylation may also be effected in two phases by preparing at first the 17β-hydroxy-17α-alkynyl-compound through a condensation reaction and converting said compound into the corresponding 17α-alkenyl- or 17α-alkyl compound by a reduction, e.g. by means of hydrogen in the presence of a catalyst, such as nickel or Pd/$BaSO_4$.

The 17-substituent $R_7$ is e.g. methyl, ethyl, propyl, butyl, iso-propyl, vinyl, propenyl, isopropenyl, allyl, methallyl, ethynyl, propynyl, propargyl, butynyl, butadienyl, butadiynyl, propadienyl or butenynyl.

The 17α-methyl group in the 11,11-alkylidene steroids of the (19-nor-) pregnane series is preferably already present in the starting steroid for the 11,11-alkenylation reaction.

The hydroxy group in the position 3, 17, 20 and/or 21 may also be introduced after the introduction of the 11,11-alkylidene group. The hydroxy group in the position 3 or 20 is usually obtained by reduction of the oxo group present in said position, e.g. with $LiAl[OC(CH_3)_3]_3H$ or $NaBH_4$.

Into the 11,11-alkylidene-$\Delta^4$-(19-nor-)pregnenes according to the invention a 17α-hydroxy group may be introduced with the $O_2$-oxidation-method according to Barton, in which the 3-enolether of a $\Delta^4$-3,20-diketone is treated with oxygen in strong alkaline medium and the 17α-perhydroxy compound thus formed is treated with a reducing agent, such as zinc and hydrochloric acid.

A 21-hydroxy group may be introduced into the 11,11-alkylidene compounds of the (19-nor-) pregnane series, for example by reaction with iodine in the presence of calcium-oxide and treatment of the 21,21-diiodo compound, thus obtained, with an alkalimetal salt of a lower aliphatic fatty acid, such as potassium acetate, and hydrolysis of the 21-acetate to the 21-hydroxy compound. A direct 21-acetoxylation is also possible by means of lead tetraacetate in the presence of borotrifluoride, whereafter by hydrolysis of the 21-acetate, thus formed, the 21-hydroxy compound is obtained.

The 21-hydroxy group may be converted into the 21-fluoro substituent by treating for example with an organic sulphonic acid chloride, such as methane sulphonyl chloride or toluene sulphonyl chloride, treating the 21-sulphonate thus obtained with an alkalimetal iodide, such as sodium iodide, and reacting the 21-iodo compound thus formed, with a metal fluoride, such as silver fluoride or potassium fluoride. The 21-iodo compound may also be obtained by direct bromination of the 21-position with bromine in the presence of cupribromide, followed by a treatment of the 21-bromo compound thus formed with an alkali metal iodide such as sodium iodide.

The 21-sulphonate, e.g. the 21-tosylate or the 21-mesylate, may also be converted into the 21-fluoride directly by treatment with a metal fluoride, such as silver fluoride or potassium fluoride.

The 21-chloride may be obtained by treating the 21-sulphonate with an alkali metal chloride, such as lithium chloride.

A methyl group in the position 6 of the 11,11-alkylidene steroids of the (19-nor-)pregnane series may be present in the starting steroid or may be introduced after the introduction of the 11,11-alkylidene group according to methods known per se. A known method consists therein that the 3-enol ether of 3-oxo-$\Delta^4$ compound is reacted with formaline and N-methylaniline and the 6-$CH_2$-N-methyl-aniline substituent thus obtained is converted into the 6-methylene group with acid, e.g. hydrochloric acid. The 6-methylene group is reduced thereafter to the 6α-$CH_3$ group, e.g. with $H_2$ and Pt or Pd on carbon as catalyst.

The 3-enol ether may also be reacted with Vilsmeier reagent, followed by hydrolysis of the reaction product. Vilsmeier reagent consists of a formamide, preferably dimethylformamide, and an acid halide, such as phosphoroxychloride or phosgene. In this way the 6-formyl-$\Delta^{3,5}$-3-ethylether is obtained, the 6-formyl group of which may be converted into the 6-hydromethyl group by gentle reduction, e.g. with $LiAl[OC(CH_3)_3]_3H$ in tetrahydrofuran at room temperature. By dehydration by means of e.g. formic acid the 6-hydromethyl group may be converted into the 6,6-methylene group, during which conversion the 3-enolether is hydrolysed to the 3-oxo-$\Delta^4$ group. By isomerisation under the influence of benzylalcohol in the presence of Pd or Pt on carbon the 3-oxo-6,6-methylene-$\Delta^4$ compound may be converted into the 3-oxo-6-methyl-$\Delta^{4,6}$ compound. The 3-oxo-6,6-methylene-$\Delta^4$ compound may also be reduced with $H_2$ and Pd or Pt on carbon as catalyst to the 3-oxo-6α-methyl-$\Delta^4$ compound. The 6-formyl group may also be reduced in one step to the 6-methyl group by treatment with a noble metal catalyst, such as Pt or Pd on carbon, in the presence of cyclohexene as hydrogen donor.

Halogen in the position 6 of the (19-nor-)pregnanes, for example Cl, may be introduced by reacting the 3-enolether of the 3-oxo-$\Delta^4$ compound with N-chlorosuccinimide. The 3-oxo-6β-chloro-$\Delta^4$ compound thus formed may be isomerised to the corresponding 6α-chloro compound with acid, whereafter the $\Delta^6$ may be introduced with an appropriate quinone, such as chloranil, yielding the 3-oxo-6-chloro-$\Delta^{4,6}$ compound. The 3-oxo-6β-chloro-$\Delta^4$ compound may also be converted into the corresponding 3-enolether, whereafter said 3-enolether is converted into the 3-oxo-6-chloro-$\Delta^{4,6}$ compound by means of $MnO_2$ and acetic acid or of an appropriate quinone, such as DDQ.

The double bond between the carbon atoms 6 and 7 may be introduced into the 3-oxo-$\Delta^4$ compound be reacting said compound with an appropriate quinone, such as chloranil or DDQ, or by reacting the 3-enol-acetate of said compound with N-bromosuccinimide and dehydrobrominating the 6β-bromo compound thus obtained.

The 1,2-methylene group may be introduced by reacting an 11,11-alkylidene-$\Delta^{4,6}$-3,20-dione of the (19-nor-)pregnane series with DDQ to obtain the corresponding $\Delta^{1,4,6}$-compound, whereafter the $\Delta^{1,4,6}$-compound after ketalization of the 20-oxo-group, is converted into the corresponding 1,2-methylene-$\Delta^{4,6}$-compound by means of e.g. dimethyl sulphoxoniummethylide.

The ester groups in the positions 3, 16, 17, 20 and/or 21 of the endproducts of the present invention, if present, may be derived from inorganic acids, such as phosphoric acids, or from saturated or unsaturated organic carboxylic acids, having 1–18 carbon atoms. The preparation of the esters may be carried out by a method known per se, e.g. by a reaction of the hydroxy-steroid with the corresponding acid or with a functional derivative thereof, such as the anhydride or the halide, in the presence of p-toluene sulphonic acid or perchloric acid, or by reacting the product of the condensation reaction of the 17-oxo-steroid with a metal derivative of an unsaturated hydrocarbon group, without any preceding hydrolysis, with the corresponding acid or with a functional derivative thereof. The esterification may also take place e.g. by reacting the steroid with a carboxylic acid anhydride, such as acetic acid anhydride, in the presence of 4-dimethylamino-pyridine, and preferably in the presence of a tertiary amine, such as trimethyl amine.

By way of example of organic carboxylic acids to be used for esterification the following acids may be indicated: formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, oleic acid, palmitic acid, stearic acid, adamanthane-carboxylic acid, trimethyl acetic acid, diethyl acetic acid, cyclohexane-carboxylic acid, cyclopentyl propionic acid, cyclohexyl butyric acid, cyclohexyl propionic acid, undecylenic acid, benzoic acid, phenyl acetic acid, phenyl propionic acid, phenyl butyric acid, phenoxy acetic acid, acetyl acetic acid, malonic acid, succinic acid, glutaric acid, pimelic acid and tartaric acid.

The ether groups occurring in the endproducts in the positions 3, 16, 17, 20 and/or 21, if present, may be derived from an aliphatic, aromatic, araliphatic or heterocyclic hydrocarbon. Examples of such ether groups are the methyl ether, the butyl ether, the cyclopentyl ether, the tetrahydropyranyl ether, the cyclohexyl ether and the vinylethyl ether groups.

The 11-oxo-steroids used as starting materials for the process according to the invention may be prepared by oxidising the corresponding 11α- or 11β-hydroxy-steroids at the 11-position according to a method known per se, for example with chromic acid or with N-bromo-acetamide in pyridine and waterfree t-butanol. In steroids, unsubstituted in the 11-position, an 11α-hydroxy group may be introduced by means of a micro-organism, e.g. *Aspergillus Ochraceus*, *Rhizopus Nigricans* and *Pestalotia Royena*, after which the 11α-hydroxyl group is being oxidised.

The compounds obtained according to the process of the invention can be administered parenterally or orally, usually after mixing with auxiliaries and, if desired, with other active components, in the form of suspensions, solutions, emulsions or of solid pharmaceutical dosage units, such as tablets, pills and capsules.

The invention is illustrated with the following examples:

EXAMPLE I a. 65 g of 11α-hydroxy-Δ$^5$-estrene-3,17-dione 3,17-diethyleneketal, obtained in the conventional way by reacting 50 g of 11α-hydroxy-Δ$^4$-estrene-3,17-dione in methylene chloride with ethylene glycol under the influence of tri-ethylortho-formate and a minor amount of para-toluene sulphonic acid, were dissolved in 3.6 l of acetone. To this solution 54 ml of a 8 N CrO$_3$ solution were added dropwise during 5 minutes at −10°C and the mixture was afterstirred for 15 minutes more at the same temperature. An excess of CrO$_3$ was removed with sodium bisulphite, then the acetone was distilled off in vacuo under replenishment with water. The precipitate formed was filtered off and crystallized from methylene chloride/ether. In this way 39.7 g of Δ$^5$-estrene-3,11,17-trione 3,17-di-ethylene-ketal were obtained having a melting point of 181°–185°C.

b. A solution of 39.7 g of Δ$^5$-estrene-3,11,17-trione 3,17-di-ethylene-ketal in 400 ml of benzene was added to Wittig's Reagent, obtained by a treatment of 230 g of triphenylmethyl-phosphonium-bromide in 1 l of di-methyl sulphoxide with 28 g of NaH (50% oil suspension) in 480 ml of dimethyl sulphoxide at ambient temperature. In a N$_2$-atomsphere the reaction mixture was subsequently stirred for 3.5 hours at 70°C. After cooling down the reaction mixture was poured into water and the precipitate formed was separated by filtration. By means of distribution extraction the tri-phenyl-phosphine-oxide formed was removed. The steroid-containing phase was evaporated to dryness and crystallized from methanol containing a small amount of pyridine.

In this way 35 g of 11,11-methylene-Δ$^5$-estrene-3,17-dione 3,17-di-ethylene-ketal were obtained, having a melting point of 205°–208°C and a value of [α]$_D$ of +51° (CHCl$_3$).

c. 35 g of 11,11-methylene-Δ$^5$-estrene-3,17-dione 3,17-di-ethylene-ketal were suspended in 700 ml of acetone and stirred with 3.5 ml of concentrated hydrochloric acid for 2 hours in an N$_2$-atomsphere.

The reaction mixture was subsequently poured into water and processed by an extraction with methylene chloride. After the crystallization from ether 23 g of 11,11-methylene-Δ$^4$-estrene-3,17-dione were obtained with a melting point of 200°–201°C and an [α]$_D$ of +296° (CHCl$_3$).

EXAMPLE II a. 4.4 g of Δ$^4$-estrene-11,17-dione, obtained by oxidation with chromic acid of the corresponding 11α-hydroxy-compound, were refluxed in a mixture of 74 ml of toluene, 4 ml of ethylene glycol, 4 ml of ethylortho-formate and 0.13 g p-toluene-sulphonic acid for 3 hours.

After processing by extraction 4.9 g of Δ$^4$-estrene-11,17-dione-17-ethylene-ketal were obtained, which were used for the Wittig reaction without any further purification.

b. A solution of 4.9 g of Δ$^4$-estrene-11,17-dione-17-ethylene-ketal in 33 ml of benzene was added to the Wittig reagent, which was obtained by adding 33 g of triphenyl-methylphosphonium-bromide in 120 ml of di-methyl sulphoxide to 4 g of NaH in a 50% oil suspension in 70 ml dimethyl sulphoxide. The reaction mixture was stirred for 22 hours at 60°C in an N$_2$-atmosphere. After processing 4.7 g of crude 11,11-methylene-Δ$^4$-estren-17-one-17-ethylene-ketal were obtained.

c. 4.7 g of crude 11,11-methylene-Δ$^4$-estren-17-one-17-ethylene-ketal were hydrolysed in 100 ml of acetone and 0.5 ml of conc. hydrochloric acid at ambient temperature for 2 hours. After processing and crystallization 2.2 g of 11,11-methylene-Δ$^4$-estren-17-one with a melting point of 140°–143°C and an [α]$_D$ of +244° (CHCl$_3$) were obtained.

EXAMPLE III a. A solution of 11 g of Δ$^4$-estrene-11,17-dione-17-ethylene-ketal in 190 ml of benzene was added to a methyl magnesium bromide solution in ether. After 3 hours of boiling under reflux the reaction mixture was cooled, poured into a NH$_4$Cl-solution and processed by extraction. The residue obtained was digested in 240 ml of acetone and hydrolysed with 0.6 g of conc. hydrochloric acid at ambient temperature for 2 hours. After processing by extraction and crystallization from a small amount of methylene chloride 6 g of 11α-methyl-11β-hydroxy-Δ$^4$-estren-17-one with a melting point of 157°–160°C and an [α]$_D$ of +7.5° (CHCl$_3$) were obtained.

b. 6 g of 11α-methyl-11β-hydroxy-Δ$^4$-estren-17-one were stirred in 250 ml of formic acid for 24 hours. Then the solution was poured into water and extracted with methylene chloride. The residue was chromatographed over silicagel, which was impregnated with silver nitrate, and this resulted in the isolation of the 11,11-methylene-Δ$^4$-estren-17-one having a melting point of 140°–142°C.

c. In a similar way as described under (a) and (b), 10 g of Δ$^5$-estrene-3,11,17-trione 3,17-di-ethylene-ketal were converted into 2.4 g of 11,11-methylene-Δ$^4$-estrene-3,17-dione, having a melting point of 200°–201°C and an $[\alpha]_D$ of +296° in $CHCl_3$.

d. In a similar way as described under (a) and (b), however using isopropyl-lithium instead of methyl magnesium-bromide, 10 g of the starting compounds, mentioned under (a) and (c), were converted into 2.2 g of 11,11-isopropylidene-$\Delta^4$-estren-17-one and 2.3 g of 11,11-isopropylidene-$\Delta^4$-estrene-3,17-dione, respectively.

EXAMPLE IV

In the same way as described in Example II $\Delta^5$-estrene-11,17-dione was converted into 11,11-methylene-$\Delta^5$-estren-17-one with a melting point of 126°–129°C and an $[\alpha]_D$ of +170° ($CHCl_3$) and $\Delta^{5(10)}$-estrene-11,17-dione was converted into 11,11-methylene-$\Delta^{5(10)}$-estren-17-one.

EXAMPLE V a. A solution of 5.5 g of 3-hydroxy-$\Delta^{1,3,5(10)}$-estratriene-11,17-dione-3-methylether 17-ethyleneketal in 55 ml of a tetrahydrofuran-ether-mixture was added dropwise to a trimethyl-silyl-methyl-magnesiumchloride solution, obtained by reacting 7.8 g of magnesium in 625 ml of ether with 42 ml of trimethyl-silyl-methylchloride. After a boiling period of 2.5 hours and stirring for 24 hours at ambient temperature the reaction mixture was poured into a $NH_4Cl$ solution and processed by extraction. After crystallization from ethanol 3.8 g of 3,11-dihydroxy-11-trimethyl-silyl-methyl-$\Delta^{1,3,5(10)}$-estratrien-17-one-3-methylether 17-ethyleneketal were obtained with a melting point of 144°–148°C.

b. 3.8 g of 3,11-dihydroxy-11-trimethyl-silyl-methyl-$\Delta^{1,3,5(10)}$-estratrien-17-one-3-methylether 17-ethyleneketal were stirred in 65 ml of acetone and 0.15 ml of conc. hydrochloric acid for 16 hours at ambient temperature. The reaction mixture was neutralised with potassium acetate and evaporated to a small volume in vacuo, whereby the steroid crystallized. In this way 2.3 g of 3-hydroxy-11,11-methylene-$\Delta^{1,3,5(10)}$-estratrien-17-one-3-methylether were obtained with a melting point of 173°–179°C and an $[\alpha]_D$ of +426° ($CHCl_3$).

c. 2.3 g of 3-hydroxy-11,11-methylene-$\Delta^{1,3,5(10)}$-estratrien-17-one-3-methyl-ether were dissolved in 85 ml of tetrahydrofuran and added to a potassium-acetylide solution in tetrahydrofuran at 0°–5°C. After stirring at 0°–5°C for 2 hours the reaction mixture was processed and crystallized from methanol.

In this way 1.4 g of 11,11-methylene-17$\alpha$-ethynyl-$\Delta^{1,3,5(10)}$-estratriene-3,17$\beta$-diol 3-methylether were obtained with a melting point of 194°–198°C and an $[\alpha]_D$ of +232° ($CHCl_3$). By replacing the potassium acetylide solution by a sodium-vinyl-acetylide-solution, obtained by a reaction of vinylacetylene with sodium amide in liquid ammonia, the corresponding 17$\alpha$-butenynyl-17$\beta$-hydroxy compound was obtained in a similar way from 3-hydroxy-11,11-methylene-$\Delta^{1,3,5(10)}$-estratrien-17-one 3-methylether.

EXAMPLE VI

In a similar way as described in Example V 3,16$\alpha$-17$\beta$-trihydroxy-$\Delta^{1,3,5(10)}$-estratrien-17-one 3-methylether was reacted with trimethylsilyl-methyl-magnesiumchloride. The reaction was terminated by pouring the reaction mixture into an ammonium chloride solution. After processing by extraction, chromatography and crystallization 11,11-methylene-$\Delta^{1,3,5(10)}$-estratriene-3,16$\alpha$,17$\beta$-triol 3-methylether was obtained.

EXAMPLE VII

To the triphenyl-phosphonium-ethylide reagent, obtained by reacting 180 g of triphenyl-ethyl-phosphonium-iodide in 800 ml of dimethyl sulphoxide with 21 g of NaH (50% oil suspension) in 360 ml of dimethyl sulphoxide, 30 g of $\Delta^5$-estrene-3,11,17-trione 3,17-diethylene-ketal in 300 ml benzene were added. Then it was stirred during 22 hours at 60°C. After processing and chromatography on silicagel 8.4 g of 11,11-(E)-ethylidene-$\Delta^5$-estrene-3,17-dione-3,17-diethyleneketal with a melting point of 172°–175°C and an $[\alpha]_D$ of +47° ($CHCl_3$) were obtained, from which by hydrolysis in acetone with hydrochloric acid at ambient temperature 11,11-(E)-ethylidene-$\Delta^4$-estrene-3,17-dione was obtained quantitatively, with a melting point of 191°–193°C and an $[\alpha]_D$ of +268° ($CHCl_3$).

In a similar way $\Delta^5$-estrene-11,17-dione 17-ethyleneketal and $\Delta^{5(10)}$-estrene-11,17-dione 17-ethylene-ketal were converted into 11,11-(E)-ethylidene-$\Delta^5$-estren-17-one and 11,11-(E)-ethylidene-$\Delta^{5(10)}$-estren-17-one, respectively.

EXAMPLE VIII a. To a suspension of 5 g of 11,11-(E)-ethylidene-$\Delta^4$-estrene-3,17-dione in 55 ml of methanol at 0°C subsequently 5 ml of ethane-dithiol and 5 ml of $BF_3$-etherate were added. The reaction mixture was stirred for 1 more hour at this temperature, and then the precipitate formed was separated by filtration, washed with cold methanol and dried in vacuo.

In this way 5.0 g of 11,11-(E)-ethylidene-$\Delta^4$-estrene-3,17-dione 3-ethylene-dithioketal with a melting point of 204°–206°C and an $[\alpha]_D$ of +234° ($CHCl_3$) were obtained.

b. 5.0 g of 11,11-(E)-ethylidene-$\Delta^4$-estrene-3,17-dione-3-ethylene-dithioketal were stirred in 42 ml of ethanol with 1.2 g of $NaBH_4$ at ambient temperature for 2 hours. The excess of $NaBH_4$ was decomposed with 50% acetic acid. The reaction mixture was diluted with water and the precipitate was filtered off. In this way 5.0 g of 11,11-(E)-ethylidene-17$\beta$-hydroxy-$\Delta^4$-estren-3-one 3-ethylene-dithioketal were obtained with a melting point of 189°–190°C and an $[\alpha]_D$ of +187° ($CHCl_3$).

c. 5.0 g of 11,11-(E)-ethylidene-17$\beta$-hydroxy-$\Delta^4$-estren-3-one 3-ethylene-dithio-ketal were dissolved in 25 ml of tetrahydrofuran and added to a solution of 3.5 g of sodium in 125 ml of liquid $NH_3$ at –40°C. After 30 minutes of stirring at this temperature the excess of sodium was destroyed by adding ethanol with caution. The ammonia was evaporated. After processing and crystallization from ethanol 3.0 g of 11,11-(E)-ethylidene-$\Delta^4$-estren-17$\beta$-ol were obtained with a melting point of 139°–141°C and an $[\alpha]_D$ of +170° ($CHCl_3$).

d. 3.0 g of 11,11-(E)-ethylidene-$\Delta^4$-estrene-17$\beta$-ol were dissolved in 150 ml of acetone. Dropwise with stirring 4.8 ml of 8 N $CrO_3$ were added at –10°C. Then the reaction mixture was poured into water, filtered off and crystallized from ethanol.

In this way 2.5 g of 11,11-(E)-ethylidene-$\Delta^4$-estren-17-one were obtained with a melting point of 92°–93°C and an $[\alpha]_D$ of +226° ($CHCl_3$).

EXAMPLE IX a. To a solution of 0.5 g of 11,11-methylene-$\Delta^4$-estrene-3,17-dione in 20 ml of methanol and 8 ml of methylene chloride a solution of 75 mg of $NaBH_4$ and 120 mg of NaOH in 6 ml of methanol was added in a nitrogen atmosphere during about 30 minutes at 0°–5°C. After 1 hour more of stirring at 0°–5°C and processing 1.5 g of crude 11,11-methylene-17β-hydroxy-$\Delta^4$-estren-3-one were obtained.

b. 1.5 g of 11,11-methylene-17β-hydroxy-$\Delta^4$-estren-3-one were dissolved in a mixture of 6 ml of acetone and 2 ml of pyridine and were stirred at ambient temperature during 3 hours with 1.2 ml of phenyl propionic acid chloride. This reaction mixture was then poured into an aqueous sodium bicarbonate solution and after 2 hours of stirring it was processed by extraction. After a chromatographic treatment on silicagel and crystallization from hexane 1.1 g of 11,11-methylene- 17β-hydroxy-$\Delta^4$-estren-3-one 17β-phenyl-propionate with a melting point of 121°–123°C and an $[\alpha]_D$ of +138° (CHCl$_3$) was obtained.

In a similar way 11,11-methylene-17β-hydroxy-$\Delta^4$-estren-3-one was converted into the corresponding 17β-acylate, derived from acetic acid, butyric acid, valeric acid, undecylenic acid, adamantane carboxylic acid, phenoxy acetic acid, benzoic acid and lauric acid.

EXAMPLE X a. 3.5 g of 11,11-methylene-$\Delta^4$-estrene-3,17-dione were boiled in 14 ml of methanol with 1.5 ml of pyrrolidine for 5 minutes. After cooling, the precipitate was filtered off and washed with cold methanol. In this way 4.0 g of 3-N-pyrrolidinyl-11,11-methylene-$\Delta^{3,5}$-estradien-17-one were obtained.

4.0 g of 3-N-pyrrolidinyl-11,11-methylene-$\Delta^{3,5}$-estradien-17-one were added to a potassium-acetylide solution, which was prepared by conducting acetylene through a suspension of 6.2 g of potassium-tert.-butylate in 190 ml of tetrahydrofuran. After stirring for 45 minutes at 0°–5°C the reaction mixture was poured into water, filtered off and digested in a mixture of acetic acid, water, methanol and sodium acetate in order to split off the 3-pyrrolidino-group.

After processing by filtration, chromatographic treatment on silicagel and crystallization from hexane 3.0 g of 11,11-methylene-17α-ethynyl-17β-hydroxy-$\Delta^4$-estren-3-one having a melting point of 212°–213°C and an $[\alpha]_D$ of +103° (CHCl$_3$) were obtained.

b. The 17α-ethynyl-compound obtained in Example X a) was selectively hydrogenated by means of pre-hydrogenated Pd on barium sulphate (5%) to 11,11-methylene-17α-vinyl-17β-hydroxy-$\Delta^4$-estren-3-one. After further reduction, until 2 mols of hydrogen were assimilated, the 11,11-methylene-17α-ethyl-17β-hydroxy-$\Delta^4$-estren-3-one was obtained.

c. By esterification of the compounds, obtained in Examples X (a) and (b), the 17β-acylates of same were obtained, which were derived from acetic acid, enanthic acid, capric acid and phenyl propionic acid.

d. In a similar way as described in Example X (a), 1 g of 11,11-isopropylidene-$\Delta^4$-estrene-3,17-dione was converted into 0.6 g of 11,11-isopropylidene-17α-ethynyl-17β-hydroxy-$\Delta^4$.estren-3-one.

e. In a similar way as described in Example X (a) and using butyllithium instead of potassium-acetylide, 2 g of 11,11-methylene-$\Delta^4$-estrene-3,17-dione were converted into 1.2 g of 11,11-methylene-17α-butyl-17β-hydroxy-$\Delta^4$-estren-3-one.

f. 2 g of 11,11-methylene-17α-ethynyl-17β-hydroxy-$\Delta^4$-estren-3-one 17β-acetate, obtained in Example X (c), were reduced in 3-position with NaBH$_4$ in alkaline medium to 11,11-methylene-17α-ethynyl-$\Delta^4$-estrene-3β,17β-diol 17β-acetate, whereafter the 3β-hydroxy group thereof was acetylated with acetic acid anhydride/pyridine to give 1.6 g of 11,11-methylene-17α-ethynyl-$\Delta^4$-estrene-3β,17β-diol 3β,17β-di-acetate.

EXAMPLE XI 2.0 g of 11,11-methylene-$\Delta^4$-estren-17-one which were dissolved in 11 ml of tetrahydrofuran, were added to a potassium acetylide solution in tetrahydrofuran at 0°–5°C. After 45 minutes of stirring at this temperature the reaction mixture was processed by extraction. Purification by means of column chromatography and crystallization from methanol yielded 1.7 g of 11,11-methylene-17α-ethynyl-$\Delta^4$-estren-17β-ol having a melting point of 143°–145°C and an $[\beta]_D$ of +74° (CHCl$_3$).

In a similar way, starting from 11,11-(E)-ethylidene-$\Delta^4$-estren-17-one the pure 11,11-(E)-ethylidene-17α-ethynyl-$\Delta^4$-estren-17β-ol was obtained in the form of an oil having an $[\alpha]_D$ of +54° (CHCl$_3$); starting from 11,11-methylene-$\Delta^5$-estren-17-one the pure 11,11-methylene-17α-ethynyl-$\Delta^5$-estren-17β-ol was obtained having a melting point of 155°–157°C and an $[\alpha]_D$ of +1° (CHCl$_3$); and starting from 11,11-methylene-$\Delta^{5(10)}$-estren-17-one the pure 11,11-methylene-17α-ethynyl-$\Delta^{5(10)}$-estren-17β-ol was obtained.

In a similar way as described in Example X (b), the following compounds were obtained by a selective reduction of the 17α-ethynyl-group:

11,11-methylene-17α-vinyl-$\Delta^4$-estren-17β-ol,
11,11-methylene-17α-ethyl-$\Delta^4$-estren-17β-ol,
11,11-methylene-17α-vinyl-$\Delta^5$-estren-17β-ol,
11,11-methylene-17α-ethyl-$\Delta^5$-estren-17β-ol,
11,11-(E)-ethylidene-17α-vinyl-$\Delta^4$-estren-17β-ol and
11,11-(E)-ethylidene-17α-ethyl-$\Delta^4$-estren-17β-ol.

The 17β-hydroxy-compounds obtained above were converted by esterification with acetic acid anhydride in the presence of pyridine into the 17β-acetates.

EXAMPLE XII a. 3.0 g of 11,11-methylene-$\Delta^4$-estren-17-one were dissolved in 40 ml of tetrahydrofuran and added to a allyl-magnesium-bromide solution in ether.

After 2 hours of stirring at ambient temperature the reaction mixture was poured into ice water containing sulphuric acid. After processing by extraction, chromatographic treatment on silicagel, and crystallization from hexane 2.7 g of 11,11-methylene-17α-allyl-$\Delta^4$-estren-17β-ol were obtained, having a melting point of 38°–43°C and an $[\alpha]_D$ of +62° (CHCl$_3$).

By replacing the allyl-magnesium bromide by propyl-magnesium bromide, butenyl-magnesium bromide and propargyl-magnesium bromide the corresponding 17α-propyl-, 17α-butenyl- and 17α-propargyl derivatives were obtained, respectively.

b. In a similar way as described in Example XII (a), starting from 11,11-methylene-18-methyl-$\Delta^4$-estrene-17-one and using allyl-magnesium bromide, propynyl-magnesium bromide, propadienyl-magnesium bromide and butadienyl-magnesium bromide, respectively, the following compounds were prepared:

11,11-methylene-17α-allyl-18-methyl-$\Delta^4$-estren-17β-ol,
11,11-methylene-17α-propynyl-18-methyl-$\Delta^4$-estren-17β-ol,
11,11-methylene-17α-propadienyl-18-methyl-$\Delta^4$-estren-17β-ol, and 11,11-methylene-17α-butadienyl-18-methyl-Δ⁴-estren-17β-ol, respectively.

c. The 17β-hydroxy-compounds obtained in Examples XII (a) and XII (b) were converted by esterification into the 17β-esters, which are derived from acetic acid, propionic acid, phenyl propionic acid and palmitic acid, and by etherification into the 17β-methyl-, 17β-butyl-, 17β-tetra-hydro-pyranyl- and 17β-ethylvinylether, respectively.

EXAMPLE XIII

An ethyl-lithium solution in a mixture of tetrahydrofuran and ether was added dropwise at −5° to −10°C to a solution of 2.8 g of 11,11-methylene-Δ⁴-estren-17-one in 32 ml benzene and 40 ml ether.

After stirring for 30 minutes at −5° to −10°C the reaction mixture was acidified with 2 N $H_2SO_4$, then poured into water and submitted to extraction. By a chromatographic treatment on silicagel and crystallization from methanol 2.2 g of 11,11-methylene-17α-ethyl-Δ⁴-estren-17β-ol were obtained having a melting point of 83°–87°C and an $[\alpha]_D$ of +126° ($CHCl_3$).

In a similar way, starting from 11,11-(E)-ethylidene-Δ⁴-estren-17-one, 11,11-(E)-ethylidene-17α-ethyl-Δ⁴-estren-17β-ol was obtained.

By an esterification the compounds obtained were converted into the 17β-acylates, which are derived from acetic acid, phenyl propionic acid, capric acid and succinic acid.

EXAMPLE XIV a. In a similar way as described in Example I 11α-hydroxy-18-methyl-Δ⁴-estrene-3,17-dione was converted into 11,11-methylene-18-methyl-Δ⁴-estrene-3,17-dione having a melting point of 153°–154°C and an $[\alpha]_D$ of +223° ($CHCl_3$).

b. In a similar way as described in Example VIII (a) 2.4 g of 11,11-methylene-18-methyl-Δ⁴-estrene-3,17-dione was converted into 2.5 g of 11,11-methylene-18-methyl-Δ⁴-estrene-3,17-dione 3-ethylene-dithioketal having a melting point of 185°–187°C and an $[\alpha]_D$ of +188° ($CHCl_3$), and in a similar way as described in Example VIII (b)—(d) the 2.5 g of this compound were converted into 1.2 g of 11,11-methylene-18-methyl-Δ⁴-estrene-17-on having a melting point of 96°–99°C and an $[\alpha]_D$ of +166° ($CHCl_3$).

EXAMPLE XV a. A solution of 1.0 g of 11,11-methylene-18-methyl-Δ⁴-estren-17-one in 33 ml tetrahydrofuran was added to a potassium-acetylide solution in tetrahydrofuran.

After 2 hours of stirring at 0°–5°C the reaction mixture was acidified with 2 N $H_2SO_4$ and processed further.

By a chromatographic treatment on silicagel and crystallization from pentane 0.7 g of 11,11-methylene-17α-ethynyl-18-methyl-Δ⁴-estren-17β-ol with a melting point of 109°–110°C and an $[\alpha]_D$ of +55° ($CHCl_3$) was obtained.

By replacing the potassium acetylide by ethyl-lithium the 11,11-methylene-17α-ethyl-18-methyl-Δ⁴-estren-17β-ol was obtained in a similar way.

b. In a similar way as described in Example X (a) 11,11-methylene-18-methyl-Δ⁴-estrene-3,17-dione was converted into 11,11-methylene-17α-ethynyl-17β-hydroxy-18-methyl-Δ⁴-estren-3-one, having a melting point of 197°–198°C and an $[\alpha]_D$ of +87.5° in $CHCl_3$.

EXAMPLE XVI a. A suspension of 10 g of 3-hydroxy-11,11-methylene-Δ$^{1,3,5(10)}$-estratrien-17-one 3-methylether in 150 ml of toluene, 6.5 ml of ethylene glycol, 8 ml of ethylorthoformate and 0.3 g of p-toluene sulphonic acid was refluxed for 3 hours. After cooling the mixture was neutralized with a 2 N NaOH-solution and washed with water. Evaporation of the toluene yielded a residue of 11 g of crude 17-ethylene ketal.

b. To a suspension of 3.3 g lithium in 300 ml of liquid $NH_3$ at −60°C a solution of 10 g of 3-hydroxy-11,11-methylene-Δ$^{1,3,5(10)}$-estratrien-17-one 3-methylether 17-ethylene-ketal in 150 ml of dry tetrahydrofuran was added. After stirring for 1 hour at −60°C 100 ml of absolute ethylalcohol were cautiously added dropwise. After evaporation of $NH_3$ the mixture was poured into water. Extraction with methylene chloride and evaporation of the extract in vacuum yielded a residue of 10.2 g of 3-methoxy-11,11-methylene-Δ$^{2,5(10)}$-estren-17-one 17-ethylene ketal. The residue was dissolved in 1 l of methanol and treated with 12.5 g of oxalic acid in 200 ml of water. After stirring for 1 hour at room temperature the mixture was neutralized with a $NaHCO_3$-solution and poured into water. The precipitate formed was filtered off, washed and dried, yielding 9.5 g of 11,11-methylene-Δ$^{5(10)}$-estrene-3,17-dione.

c. 6g of 11,11-methylene-Δ$^{5(10)}$-estrene-3,17-dione were added to a solution of 0.024 ml of $BF_3$-etherate in 50 ml of methanol. The mixture was stirred at room temperature for 4.5 hours and then brought at a pH of 7.8 with a $NaHCO_3$-solution. The mixture was poured into ice-water containing 0.5% pyridine. The precipitate formed was filtered off, washed and dried, yielding 6.5 g of 11,11-methylene-Δ$^{5(10)}$-estrene-3,17-dione 3-dimethyl ketal.

d. 5 g of the 3-dimethyl ketal, obtained in step (c), were dissolved in 140 ml of ethanol, containing 1 ml of pyridine. After the addition of 4 g of $NaBH_4$ the reaction mixture was refluxed under $N_2$ for 30 minutes. After cooling a solution of 1.6 g of KOH in 10 ml of water was added and the mixture was further refluxed for 10 minutes. After cooling again the mixture was poured into ice-water and the precipitate formed was filtered off. The precipitate (4.2 g of 11,11-methylene-17β-hydroxy-Δ$^{5(10)}$-estren-3-one 3-dimethyl ketal) was dissolved in 180 ml of methanol. To this solution 1.62 g of oxalic acid 2 aq. in 50 ml of water were added. The mixture was stirred at room temperature under $N_2$ for 1.5 hours. Pouring out into ice-water, filtering off of the precipitate formed and washing and drying of the precipitate yielded 3.3 g of 11,11-methylene-17β-hydroxy-Δ$^{5(10)}$-estren-3-one.

e. In a similar way as described in Example XI, 11,11-methylene-Δ$^{5(10)}$-estrene-3,17-dione 3-dimethyl ketal, obtained in Example XVI (c), was converted into 11,11-methylene-17α-ethynyl-17β-hydroxy-Δ$^{5(10)}$-estren-3-one 3-dimethyl ketal, whereafter the 3-dimethyl ketal-group was hydrolyzed with oxalic acid, as described in Example XVI (d) to give the free 3-ketone.

f. In a similar way as described in Example IX (c), the 17β-hydroxy compounds, obtained in Examples XVI (d) and (e), were converted into the 17β-phenylpropionate thereof, and in a similar way, using acetic acid anhydride instead of phenylpropionic acid chloride the corresponding 17β-acetates were obtained.

EXAMPLE XVII a. 5 g of $\Delta^4$-19-nor-pregnene-3,11,20-trione were dissolved in 100 ml ethylene glycol and 50 ml methylene chloride. 15 ml tri-ethyl-ortho-formiate and 0.05 g p-toluene sulphonic acid were added to it.

The reaction mixture was subsequently refluxed for 4 hours. After cooling to ambient temperature pyridine was added, the reaction mixture was diluted with water and then processed by an extraction. In this way 6.4 g of $\Delta^5$-19-nor-pregnene-3,11,20-trione 3,20-diethylene-ketal were obtained, which were used for the Wittig reaction without any further purification.

b. A solution of 6.4 g of $\Delta^5$-19-nor-pregnene-3,11,20-trione 3,20-diethylene-ketal in 65 ml benzene was added to the Wittig reagent which was obtained by adding 44 g triphenyl-methyl-phosphonium-bromide in 160 ml dimethyl sulphoxide to 5.3 g NaH (50% oil suspension) in 93 ml dimethyl sulphoxide at ambient temperature. The reaction mixture was then stirred for 5 hours at 65°C. After cooling the reaction mixture was poured into water and extracted with methylene chloride. After processing and chromatographic treatment on silicagel the fractions showing one single spot on the thin-layer-chromatogram were gathered. The 11,11-methylene-$\Delta^5$-19-nor-pregnene-3,20-dione 3,20-diethylene-ketal obtained was used in the next step without any further purification.

c. 3.5 g of 11,11-methylene-$\Delta^5$-19-nor-pregnene-3,20-dione 3,20-diethylene-ketal were suspended in 70 ml acetone, and stirred with 0.3 ml conc. hydrochloric acid during 3 hours at ambient temperature in an $N_2$-atmosphere. Then the reaction mixture was poured into water, extracted with methylene chloride and washed until neutrality. After evaporation of the extract until dryness in vacuo the residue was submitted to chromatographic treatment in a toluene-ethylacetatemixture on silicagel, and crystallized. In this way 2.3 g of pure 11,11-methylene-$\Delta^4$-19-nor-pregnene-3,20-dione were obtained, having a melting point of 167.5°–169°C and an $[\alpha]_D$ of +289° in $CHCl_3$.

d. In a similar way, 20-hydroxy-$\Delta^4$-19-nor-pregnene-3,11-dione and 17$\alpha$-hydroxy-$\Delta^4$-19-nor-pregnene-3,11,20-trione were transformed into the corresponding 11,11-methylene compounds. 11,11-Methylene-17$\alpha$-hydroxy-$\Delta^4$-19-nor-pregnene-3°-dione has a melting point of 188°–189°C and an $[\alpha]_D$ of +155° in $CHCl_3$. By an esterification of the 20-hydroxy- and 17$\alpha$-hydroxy-groups respectively, the corresponding acylates were obtained, which were derived from formic acid, acetic acid, valeric acid, enanthic acid, caproic acid and phenyl propionic acid. 11,11Methylene-17$\alpha$-hydroxy-$\Delta^4$-19-nor-pregnene-3,20-dione 17-acetate has a melting point of 195°–**°C and an $[\alpha]_D$ of +132° ($CHCl_3$).

e. In a similar way as described in Example XVI (a)–(c), using triphenylethyl phosphonium iodide instead of triphenyl methyl phosphonium bromide, $\Delta^4$-19-nor-pregnene-3,11,20-trione was converted into 11,11-(E)-ethylidene-$\Delta^4$-19-nor-pregnene-3,20-dione.

EXAMPLE XVIII a. 5 g of $\Delta^4$-pregnene-3,11,20-trione were dissolved in 100 ml of ethylene glycol and 50 ml of methylene chloride. To this solution 15 ml of tri-ethyl-ortho-formate and 0.05 g of p-toluene-sulphonic acid were added. The reaction mixture was boiled under reflux for 4 hours. Thereafter the mixture was cooled to room temperature and pyridine was added. After dilution with water the mixture was worked up by extraction. In this way 6.3 g of $\Delta^5$-pregnene-3,11,20-trione-3,20-diethylene-ketal was obtained, which was used for the Grignard reaction without further purification.

b. 40 ml 2 M methyllithium were added to a solution of 6.3 g of $\Delta^5$-pregnene-3,11,20-trione-3,20-diethylene-ketal in 150 ml of tetrahydrofurane. The mixture was stirred for 2 hours at room temperature. The reaction mixture was then poured out in ice-water and the organic solvents were distilled in vacuum. The precipitate obtained was filtered off and crystallised from acetone. In this way 4.8 g of pure 11$\alpha$-methyl-11$\beta$-hydroxy-$\Delta^5$-pregnene-3,20-dione-3,20-diethylene-ketal were obtained.

c. 4.8 g of 11$\alpha$-methyl-11$\beta$-hydroxy-$\Delta^5$-pregnene-3,20-dione-3,20-diethylene-ketal were stirred in formic acid at 50°C for 24 hours. The mixture was concentrated by evaporation to about 50 ml and then diluted with water and extracted with chloroform. The residue was chromatographed over silicagel impregnated with silvernitrate, yielding 11,11-methylene-$\Delta^4$-pregnene-3,20-dione.

EXAMPLE XIX a. 480 mg of 11,11-methylene-$\Delta^4$-pregnene-3,20-dione were suspended in a mixture of 2.2 ml of ethanol (100%) and 0.37 ml of triethylorthoformate. The mixture was stirred after the addition of 6 mg of p-toluene-sulphonic acid at 0°C for 2 hours. The reaction was stopped with pyridine and the crystalls obtained were sucked off. In this way 430 mg of 3-hydroxy-11,11-methylene-$\Delta^{3,5}$-pregnadien-20-one-3-ethylether were obtained.

b. To a solution of 0.7 g of potassium-t-butanolate and 6 ml of dry t-butanol saturated with oxygen 430 mg of 3-hydroxy-11,11-methylene-$\Delta^{3,5}$-pregnadien-20-one-3-ethylether were added at −10°C. After conducting oxygen through the mixture for 1.5 hours the reaction mixture was poured into ice-water containing 3 ml of acetic acid. The precipitate obtained was filtered off, dissolved in 10 ml of ethanol and 10 ml acetic acid and the solution was stirred with 1.3 g zinc-dust at room temperature for 4 hours. The zinc was filtered off and the filtrate was poured into water. After extraction with ethylacetate the residue was chromatographed and crystallised, yielding 110 mg of 17$\alpha$-hydroxy-11,11-methylene-$\Delta^4$-pregnene-3,20-dione.

EXAMPLE XX 2.6 g of 17$\alpha$-hydroxy-11,11-methylene-$\Delta^4$-pregnene-3,20-dione was suspended in a solution of 99 mg of p-toluene-sulphonic acid in 13 ml of acetic acid anhydride. The mixture was heated to 80°C and kept at 80°C for 30 minutes. After cooling down the reaction mixture was poured out in ice-water and then extracted with methylene chloride. The residue was taken up in 40 ml of methanol and stirred with 0.5 g of potassium-carbonate in 1.8 ml of water at room temperature for 45 minutes.

After pouring out in water the reaction mixture was extracted with methylene chloride and the residue chromatographed over silicagel. Elution with toluene-ethylacetate (1:1) and crystallisation of the pure fractions from diethylether yielded 1.3 g of pure 17$\alpha$-hydroxy-11,11-methylene-$\Delta^4$-pregnene-3,20-dione-17$\alpha$-acetate.

EXAMPLE XXI a. A suspension of 5 g of 17α-hydroxy-11,11-methylene-Δ⁴-pregnene-3,20-dione-17-acetate in 25 ml of ethanol (100%) was stirred with 7 ml of triethylorthoformate in the presence of 40 mg of p-toluene sulphonic acid, at room temperature for 2 hours. The reaction was stopped with pyridine and the precipitate was filtered off. In this way 4.8 g of 3,17α-dihydroxy-11,11-methylene-Δ$^{3,5}$-pregnadien-20-one-3-ethylether-17-acetate was obtained.

b. 4.8 g of 3,17α-dihydroxy-11,11-methylene-Δ$^{3,5}$-pregnadien-20-one-3-ethylether-17-acetate was dissolved in 100 ml of methylene chloride. Separately, 3.8 ml of fosforylchloride, 11 ml of dimethylformamide and 33 ml of methylene chloride were mixed to obtain the Vilsmeier reagent. The two solutions were mixed together with stirring at 0°C and stirred at that temperature for 1 hour. Then the reaction mixture was diluted with 55 ml of an aqueous solution containing 20% by weight of sodium acetate and the diluted mixture was extracted with ethyl acetate.

The residue obtained consisting of 5.1 g of crude 3,17α-dihydroxy-6-formyl-11,11-methylene-Δ$^{3,5}$-pregnadien-20-one 3-ethylether 17α-acetate was used for the following step without further purification.

c. The residue obtained in step (b) was dissolved in 150 ml tetrahydrofuran. The solution was mixed with 5.8 g LaAl [OC(CH$_3$)$_3$]$_3$ and stirred at room temperature for 20 minutes. The reaction mixture was then poured out in 0.5 N sulphuric acid and the precipitate formed was filtered off. Yield: 4.9 g crude 3,17α-dihydroxy-6-hydroxymethyl-11,11-methylene-Δ$^{3,5}$-pregnadien-20-one 3-ethylether 17α-acetate.

d. The ketone obtained in step (c) was mixed with 50 ml of formic acid and the mixture was stirred at room temperature for 30 minutes. Thereupon the reaction mixture was diluted with water and extracted with chloroform. The extract was subjected to evaporation of the chloroform and the residue remaining was chromatographed on silicagel. In this way 1.8 g of pure 6,6;11,11-dimethylene-17α-hydroxy-Δ⁴-pregnene-3,20-dione 17-acetate was obtained.

EXAMPLE XXII

To a solution of 2 g of 6,6,11,11-dimethylene-17α-hydroxy-Δ⁴-pregnene-3,20-dione 17α-acetate in 40 ml of ethanol was added 1 g of sodium acetate 0 aq. and then 0.6 g of a 5% Pd-on-carbon catalyst. At the temperature of boiling 13 ml of a 5% solution of benzylalcohol in ethanol were added dropwise in the course of 40 minutes. Then the catalyst was sucked off and the filtrate was evaporated to dryness in vacuum. The residue was crystallized and yielded 1.3 g of 6-methyl-11,11-methylene-17α-hydroxy-Δ⁴-pregnene-3,20-dione 17-acetate (E$_m$ = 24500 at λ$_{max}$ = 287 nm).

EXAMPLE XXIII

A mixture of 1 g of 6,6;11,11-dimethylene-17α-hydroxy-Δ⁴-pregnene-3,20-dione 17α-acetate, 3 ml of cyclohehxanone and 200 mg of a 5% Pd-on-carbon catalyst in 50 ml of 100% ethanol was refluxed for 1 hour. After cooling down to room temperature the catalyst was filtered off and the filtrate evaporated to dryness. By crystallization 0.75 g of 6α-methyl-11,11-methylene-17α-hydroxy-Δ⁴-pregnene-3,20-dione 17α-acetate (E$_m$ = 15100 at λ$_{max}$ = 240 nm) was obtained.

EXAMPLE XXIV a. In a similar way as described in Example XVIII using instead of methyllithium ethyllithium and propyllithium, respectively, Δ⁴-pregnene-3,11,20-trione was converted into 11,11-(E)-ethylidene-Δ⁴-pregnene-3,20-dione and 11,11-(E)-propylidene-Δ⁴-pregnene-3,20-dione, respectively.

b. The same process, as described in Example XVIII, carried out on 6α-methyl-Δ⁴-pregnene-3,11,20-trione; 17α-acetoxy-Δ⁴-pregnene-3,11,20-trione; 16α,17α-dimethyl-Δ⁴-pregnene-3,11,20-trione; 6α-methyl-17α-acetoxy-Δ⁴-pregnene-3,11,20-trione and 16,16-methylene-17α-acetoxy-Δ⁴-pregnene-3,11,20-trione gave 6α-methyl-11,11-methylene-Δ⁴-pregnene-3,20-dione; 11,11-methylene-17α-acetoxy-Δ⁴-pregnene-3,20-dione; 11,11-methylene-16α,17α-dimethyl-Δ⁴-pregnene-3,20-dione; 6α-methyl-11,11-methylene-17α-acetoxy-Δ⁴-pregnene-3,20-dione and 11,11; 16,16-dimethylene-17α-acetoxy-Δ⁴-pregnene-3,20-dione, respectively.

EXAMPLE XXV

In a similar way as described in Example XX, 17α-hydroxy-11,11-methylene-Δ⁴-pregnene-3,20-dione was converted into the corresponding 17α-acylates, derived from formic acid, valeric acid, oenanthic acid, capronic acid and phenylpropionic acid, respectively.

EXAMPLE XXVI a. To a solution of 2 g of 3,17α-dihydroxy-11,11-methylene-Δ$^{3,5}$-pregnadien-20-one 3-ethylether 17α-acetate in 25 ml of acetone were successively added at 0°C 0.65 g sodium acetate 3 aq. in 4.6 ml of water, 0.65 g of N-chlorosuccinimide and 0.5 ml of acetic acid. After stirring for 2 hours at 0°–5°C the reaction mixture was poured out in ice-water and the precipitate formed was filtered off. In this way 2.1 g of crude 6β-chloro-11,11-methylene-17α-hydroxy-Δ⁴-pregnene-3,20-dione 17α-acetate were obtained that were used for the next step without further purification.

b. 2.1 g of the diketone obtained in step (a) were stirred in a mixture of 3 ml of absolute alcohol, 1.7 ml of triethylorthoformate and 12 mg of p-toluenesulphonic acid at 0°C. for 1.5 hours. The reaction was stopped by adding pyridine and the mixture was poured out into water. Extraction with benzene and evaporation of the extract to dryness yielded a residue of 2.2 g of 3,17α-dihydroxy-6-chloro-11,11-methylene-Δ$^{3,5}$-pregnadien-20-one 3-ethylether 17α-acetate.

c. A solution of 2.2 g of the ketone, obtained in step (b), in 8 ml of dry dioxane was added dropwise to a suspension of 8.2 g of MnO$_2$ in 100 ml of acetic acid and 8 ml of water. After stirring at room temperature for 3 hours the manganese salts were filtered off; the filtrate was diluted with water and extracted with chloroform. After evaporation of the extract to dryness the residue was chromatographed on silicagel and the pure fraction were combined. After crystallization pure 6-chloro-11,11-methylene-17α-hydroxy-Δ$^{4,6}$-pregnadiene-3,20-dione 17α-acetate was obtained.

EXAMPLE XXVII

A solution of 1 g of 6-chloro-11,11-methylene-17α-hydroxy-Δ$^{4,6}$-pregnadiene-3,20-dione 17α-acetate in 20 ml tetrahydrofuran was stirred at room temperature with 1.13 g of LiAl [OC(CH$_3$)$_3$]$_3$H for 2 hours. Thereupon the reaction mixture was poured out into water and the precipitate formed was filtered off and dried. The dried precipitate was re-acetylated in pyridine/acetic acid anhydride at room temperature for 16 hours. The reaction mixture was then poured out into water. The precipitate formed was filtered off and purified by crystallization, yielding pure 3β,17α-dihydroxy-6-chloro-11,11-methylene-$\Delta^{4,6}$-pregnadien-20-one 3β,17α-diacetate.

EXAMPLE XXVIII

To a soution of 1 g of 11,11-methylene-17α-hydroxy-$\Delta^4$-pregnene-3,20-dione in 50 ml of $CH_3I$ 3 g of $Ag_2O$ were added. The mixture was refluxed for 6 hours. After cooling the mixture was poured into water. Extraction and further purification through chromatography yielded 0.3 g of 11,11-methylene-17α-hydroxy-$\Delta^4$-pregnene-3,20-dione 17α-methylether.

EXAMPLE XXIX

A mixture of 1 g of 11,11-methylene-17α-hydroxy-$\Delta^4$-pregnene-3,20-dione 17α-acetate and 1 g of chloranil in 25 ml of dichloro-aethane was refluxed for 1 hour. After cooling down to room temperature the formed tetrachlorohydroquinone was filtered off. The filtrate was evaporated to dryness and the residue obtained was chromatographed, yielding pure 11,11-methylene-17α-hydroxy-$\Delta^{4,6}$-pregnadiene-3,20-dione 17α-acetate.

EXAMPLE XXX

To a solution of 2 g of 11,11-methylene-17α-hydroxy-$\Delta^4$-pregnene-3,20-dione in a mixture of 18 ml of methylene chloride and 5 ml of methanol was added 1.5 g of calcium oxide. To the suspension obtained a solution of 0.35 g of calciumchloride and 1.9 g of iodine in 10 ml of methanol was added dropwise at room temperature, under nitrogen and in the course of 45 minutes. The reaction mixture was stirred thereafter until complete decolourization, whereafter the calcium salts were filtered off. After the addition of water to the filtrate the methylene chloride layer was separated off, dried on sodium sulphate and evaporated to dryness in vacuum at low temperature. The residue obtained was dissolved in 20 ml of dimethylformamide. 2.3 g of waterfree potassium acetate were added to this solution. The reaction mixture was heated to 60°C and stirred at this temperature for 2 hours. After cooling to room temperature the reaction mixture was poured out into water and processed by extraction with ethyl acetate. The extract was dried and evaporated to dryness and the residue was chromatographed on silicagel and crystallized, yielding pure 11,11-methylene-17α,21-dihydroxy-$\Delta^4$-pregnene-3,20-dione 21-acetate.

EXAMPLE XXXI a. A suspension of 10 g of 11,11-methylene-$\Delta^4$-pregnene-3,20-dione and 9 g of chloranil in 200 ml of dichloro aethane was refluxed for 2 hours. After cooling the formed tetrachloro hydroquinone was filtered off, the filtrate subjected to evaporation to dryness and the residue chromatographed. Further purification by crystallization gave 6 g of pure 11,11-methylene-$\Delta^{4,6}$-pregnadiene-3,20-dione.

b. A suspension of 6 g of 11,11-methylene-$\Delta^{4,6}$-pregnadiene-3,20-dione and 6 g of DDQ in 120 ml of dioxane was refluxed for 2.5 hours. After cooling to room temperature the hydroquinone was filtered off and the product isolated from the filtrate. Chromatography on silicagel and crystallization yielded 2.4 g of 11,11-methylene-$\Delta^{1,4,6}$-pregnatriene-3,20-dione.

c. A mixture of 2.4 g of 11,11-methylene-$\Delta^{1,4,6}$-pregnatriene-3,20-dione, 50 ml of ethylene glycol, 25 ml of methylene chloride, 8 ml of triethylorthoformate and 0.03 g of p-toluene sulphonic acid was refluxed for 4 hours. After cooling the product was isolated by extraction, yielding 2.7 g of 11,11-methylene-$\Delta^{1,4,6}$-pregnatriene-3,20-dione 20-ethylene-ketal.

d. To a solution of 2.16 g of trimethylsulphoxoniumiodide in 20 ml of dry dimethylsulphoxide 0.48 g NaH (50% oil suspension) were added, whereafter the mixture was stirred at room temperature for 20 minutes. Thereupon 2.7 g of 11,11-methylene-$\Delta^{1,4,6}$-pregnatriene-3,20-dione 20-ethylene-ketal were added and the mixture was stirred at room temperature for 3 hours. After dilution with water the product was isolated by extraction. After evaporation of the extract the residue was dissolved in 20 ml of acetone and treated with 0.1 ml of 38% hydrochloric acid at room temperature for 2 hours. The product was isolated by extraction, chromatography on silicagel and crystallization, yielding 1α,2α; 11,11-dimethylene-$\Delta^{4,6}$-pregnadiene-3,20-dione.

EXAMPLE XXXII a. 1 g of 11α, 21-dihydroxy-16α-ethyl-$\Delta^4$-19-nor-pregnene-3,20-dione was dissolved in 50 ml of dry benzene. To this solution 5 ml of ethylene glycol were added. Thereafter the solution was boiled for 15 minutes under separation of water. After the addition of 30 mg of p-toluene sulphonic acid the reaction mixture was refluxed under separation of water for 4 hours. After cooling a saturated solution of $NaHCO_3$ was added, whereafter the product was isolated with methylene chloride, yielding 11α,21-dihydroxy-16α-ethyl-$\Delta^4$-19-nor-pregnene-3,20-dione 3,20-di-ethylene ketal.

b. To 60 ml of cooled pyridine were added under nitrogen 0.6 g of $Cr_2O_3$ in small portions. The mixture containing the $Cr_2O_3$-pyridine-complex was heated to room temperature, whereafter 1 g of the 3,20-diketal obtained in step (a) and dissolved in 80 ml of pyridine was added. The reaction mixture was put aside at room temperature. After 20 hours it was poured out into 100 ml of water containing 3 g of $NaHCO_3$. After steam distillation of the mixture the product was isolated with methylene chloride, yielding 16α-ethyl-21-hydroxy-$\Delta^4$-19-nor-pregnene-3,11,20-trione 3,20-diethylene ketal.

c. To Wittig's reagent, obtained by adding 0.8 g NaH (50%) oil suspension) in 14 ml of dry dimethyl sulphoxide to a solution of 6.6 g of methyltriphenylphosphoniumbromide in 24 ml of dry dimethylsulphoxide with stirring and further stirring at room temperature for 15 minutes, a solution of 1 g of the trione obtained in step (b) and dissolved in 7 ml of dry benzene was added. The mixture was stirred under nitrogen at 60°C for 22 hours. After cooling the reaction mixture was poured out into water, the precipitate formed was filtered off and purified through a methanol-water-benzene-separation, yielding 11,11-methylene-16α-ethyl-21-hydroxy-$\Delta^4$-19-nor-pregnene-3,20-dione 3,20-di-ethylene ketal.

d. 1 g of the diketal obtained in step (c) was dissolved in 50 ml of methanol whereafter 5 ml of 8% sulphuric acid were added to this solution. The reaction mixture was refluxed for 1 hour. After cooling the mixture was poured out into water, neutralized with a solution of $NaHCO_3$ and the product was isolated with methylene chloride and purified by chromatography, yielding 11,11-methylene-16α-ethyl-21-hydroxy-Δ$^4$-19-norpregnene-3,20-dione.

e. The same process, as described, under (a)–(d) above, when carried out on 11α, 21-dihydroxy-16α-methyl-Δ$^4$-19-norpregnene-3,20-dione; 11α-hydroxy-16α-isopropyl-Δ$^4$-pregnene-3,20-dione; 11α,21-dihydroxy-16α-butyl-Δ$^4$-pregnene-3,20-dione and 11α-hydroxy-16α-methyl-Δ$^4$-pregnene-3,20-dione gave 11,11-methylene-16α-methyl-21-hydroxy-Δ$^4$-19-norpregene-3,20-dione; 11,11-methylene-16α-isopropyl-Δ$^4$-pregnene-3,20-dione; 11,11-methylene-16α-butyl-21-hydroxy-Δ$^4$-pregnene-3,20-dione and 11,11-methylene-16α-methyl-Δ$^4$-pregnene-3,20-dione, respectively.

EXAMPLE XXXIII a. 1 g of 11,11-methylene-16α-ethyl-21-hydroxy-Δ$^4$-19-norpregnene-3,20-dione was dissolved in 7 ml of pyridine. After cooling to −20°C 0.4 ml of methane sulphonyl-chloride were added under nitrogen, whereafter the mixture was stirred at −20°C for 2.5 hours. The reaction mixture was then poured out into 70 ml of ice-water, stirred for 30 minutes and thereafter extracted with methylene chloride. The extract was dried and evaporated to dryness in vacuum, yielding 11,11-methylene-16α-ethyl-21-hydroxy-Δ$^4$-19-nor-pregnen-3,20-dione 21-mesylate.

b. 1 g of the 21-mesylate obtained in step (a) was dissolved in 35 ml of acetone. A solution of 6.5 g of sodium iodide in 50 ml of acetone was added, whereafter the reaction mixture was refluxed under nitrogen for 30 minutes. After cooling the reaction mixture was poured out into 500 ml of water. The precipitate was sucked off, yielding 11,11-methylene-16α-ethyl-21-iodo-Δ$^4$-19-nor-pregnene-3,20-dione.

EXAMPLE XXXIV 1 g of 11,11-methylene-16α-ethyl-21-iodo-Δ$^4$-19-norpregnene-3,20-dione was dissolved in 30 ml of acetonitril. After the addition of 3.4 ml of a 25% solution of AgF in water, the solution was stirred in the dark under nitrogen at 65°C for 20 hours. After cooling the silver salts were filtered off on Hyflo, whereafter the silver salts were washes with acetonitril. The combined filtrate was poured out into 300 ml of ice-water and the precipitate formed was sucked off. The residue was purified by chromatography on silicagel, yielding 11,11-methylene-16α-ethyl-21-fluoro-Δ$^4$-19-nor-pregnene-3,20-dione.

EXAMPLE XXXV

The processes of Examples XXXIII and XXXIV, when carried out on 11,11-methylene-16α-methyl-21-hydroxy-Δ$^4$-19-nor-pregnene-3,20-dione and 11,11-methylene-16α-butyl-21-hydroxy-Δ$^4$-pregnene-3,20-dione gave 11,11-methylene-16α-methyl-21-fluoro-Δ$^4$-19-nor-pregnene-3,20-dione and 11,11-methylene-16α-butyl-21-fluoro-Δ$^4$-pregnene-3,20-dione, respectively.

EXAMPLE XXXVI a. 1 g of 11,11-methylene-16α-ethyl-21-hydroxy-Δ$^4$-19-nor-pregnene-3,20-dione was suspended in a mixture of 4 ml of acetic acid anhydride and 0.4 ml of pyridine. To the mixture 2.3 ml of acetyl chloride were added. The mixture was stirred at room temperature for 30 minutes and then refluxed for 3 hours. After cooling in ice the mixture was diluted with caution by adding water dropwise, whereafter the mixture was stirred for 60 minutes. The product was isolated with methylene chloride, yielding 3,21-dihydroxy-11,11-methylene-16α-ethyl-Δ$^{3,5}$-19-nor-pregnen-20-one 3,21-diacetate.

b. 1 g of the diacetate obtained in step (a) was dissolved in 40 ml of acetone and 0.015 ml of pyridine. To this solution a solution of 0.7 g of sodium acetate in 5 ml of water was added with stirring. The reaction mixture was cooled in an ice-bath to about 0°C, whereafter 0.45 g of N-bromosuccinimide and 0.3 ml of acetic acid were added. Thereafter the reaction mixture was stirred at 0°C for 1 hour. The reaction mixture was filtered on Hyflo and the filtrate was evaporated in vacuum to about 10 ml. Ice-water was added to the residue, whereafter the mixture was extracted with methylene chloride. The extract was evaporated in vacuum at low temperature to a small volume, whereafter 10 ml of dimethylformamide were added and the rest of the methylene chloride was evaporated in vacuum. To the remaining solution 1 g of lithiumbromide and 1 g of lithiumcarbonate were added, whereafter the mixture was refluxed under nitrogen with stirring for 45 minutes. After cooling the reaction mixture was poured out into ice-water containing 2 ml of acetic acid. The precipitate formed was sucked off and dissolved in 3 ml of methylene chloride and 4 ml of methanol. The solution was cooled to 50°C whereafter a solution of 0.13 g of sodium hydroxide in 2 ml of methanol was added under nitrogen. After stirring for 1.5 hours at room temperature the reaction mixture was neutralised with 0.45 ml of 50% acetic acid, whereafter the methylene chloride was distilled in vacuum. After cooling to −15°C the crystals were sucked off and purified by chromatography, yielding 11,11-methylene-16α-ethyl-21-hydroxy-Δ$^{4,6}$-19-nor-pregnadiene-3,20-dione.

EXAMPLE XXXVII

In a similar way as described in the Examples XXXIII and XXXIV, the Δ$^{4,6}$-diketone obtained in Example XXXVI was converted via the 21-mesylate and the 21-iodo-compound, into 11,11-methylene-16α-ethyl-21-fluoro-Δ$^{4,6}$-19-nor-pregnadiene-3,20-dione.

EXAMPLE XXXVIII a. 1 g of 16α-ethyl-21-hydroxy-Δ$^4$-19-nor-pregnene-3,11,20-trione 3,20-di-ethylene ketal was dissolved in 11 ml of dry benzene and 14 ml of dry di-ethylether. After the addition of a drop of pyridine the solution was cooled to −10°C. At this temperature and in the course of 1 hour 3.8 ml of 1.68 N ethyllithium were added dropwise, whereafter the mixture was stirred at room temperature for 0.5 hour. The reaction mixture was then poured out into ice-water and the precipitate formed was sucked off, yielding 11-ethyl-11,21-dihydroxy-16α-ethyl-Δ$^4$-19-nor-pregnene-3,20-dione 3,20-di-ethylene ketal.

b. 1 g of the 3,20-diketal obtained in step (a) was dissolved in 40 ml of formic acid. The solution was heated to 50°C and stirred at this temperature for 6.5 hours. The reaction mixture was poured out into ice-water and the precipitate was sucked off. After drying the precipitate was dissolved in 50 ml of methanol and 5 ml of 8% sulphuric acid. The solution was refluxed for 50 minutes. After cooling water was added, whereafter the mixture was neutralized with sodium bicarbonate and the product isolated with methylene chloride, yielding 11,11-(E)-ethylidene-16α-ethyl-21- hydroxy-Δ⁴-19-nor-pregnene-3,20-dione.

c. The processes described in (a) and (b) above, when carried out on 6α,16α-dimethyl-21-hydroxy-Δ⁴-19-nor-pregnene-3,11,20-trione 3,20-di-ethylene ketal gave 6α, 16α-dimethyl-11,11-(E)-ethylidene-21-hydroxy-Δ⁴-19-nor-pregnene-3,20-dione.

d. The 21-hydroxy compounds obtained in (b) and (c) above were converted into the 21-fluoro compounds, using the processes of the Examples XXXIII and XXXIV.

EXAMPLE XXXIX a. 1 g of 11,11-methylene-16α-ethyl-21-hydroxy-Δ⁴-19-nor-pregnene-3,20-dione 3,20-di-ethylene ketal 21-acetate was dissolved in 30 ml of dry acetone. 0.1 g of p-toluene sulphonic acid were added to this solution. The reaction mixture was put aside at room temperature for 14 hours, whereafter it was neutralized with an aqueous solution of sodium bicarbonate. The product was isolated with methylene chloride, yielding 11,11-methylene-16α-ethyl-21-hydroxy-Δ⁴-19-nor-pregnene-3,20-dione 20-ethylene ketal 21-acetate.

b. 1 g of the ketal obtained in step (a) was dissolved in 50 ml of tetrahydrofuran. To this solution a solution of 2.5 g of LiAl[OC(CH₃)₃]₃H in 10 ml of tetrahydrofuran was added. The reaction mixture was stirred at room temperature for 2 hours and thereafter cooled to 0°C. At this temperature 11 ml of 15% acetic acid were added with caution. The reaction mixture was poured out into ice-water and the product was isolated with methylene chloride, acetylated and purified by chromatography, yielding 3,21-dihydroxy-11,11-methylene-16α-ethyl-Δ⁴-19-nor-pregnen-20-one 20-ethylene ketal 3,21-diacetate.

c. In the way as described in Example XXXII (d) the ketal, obtained in step (b) above was hydrolysed to 3,21-dihydroxy-11,11-methylene-16α-ethyl-Δ⁴-19-nor-pregnen-20-one 3,21-diacetate.

EXAMPLE XL a. 2 ml of fenylpropionic acid chloride were added to a solution of 2 g of 11,11-methylene-16α-ethyl-21-hydroxy-Δ⁴-19-nor-pregnene-3,20-dione in 10 ml of pyridine at 0°C. The mixture was stirred for 4 hours, then diluted with 2 ml of water and stirred for another hour. The reaction mixture was poured out into ice-water. The product was isolated with methylene chloride and chromatographed on silicagel, yielding 11,11-methylene-16α-ethyl-21-hydroxy-Δ⁴-19-nor-pregnene-3,20-dione 21-phenylpropionate.

b. In a similar manner, the 21-hydroxy compounds obtained in the Examples XXXII, XXXVI and XXXVIII were converted into the corresponding 21-acylates, derived from propionic acid, oenanthic acid, phenyl-propionic acid, undecylenic acid, lauric acid and stearic acid.

We claim:
1. An 11,11-alkylidene steroid of the formula:

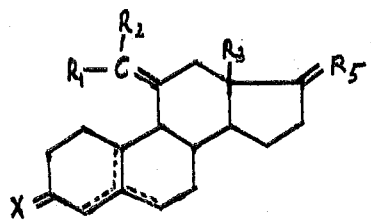

wherein $R_1$ and $R_2$ are selected from the group consisting of hydrogen and methyl; $R_3$ is selected from the group consisting of methyl and ethyl; $R_5$ is selected from the group consisting of oxygen, $\alpha H$ ($\beta R_6$) and $\alpha R_7$ ($\beta R_6$), wherein $R_6$ is selected from the group consisting of hydroxy and acylated hydroxy, the acyl group of which is derived from a saturated or unsaturated organic carboxylic acid having 1–18 carbon atoms; $R_7$ is saturated or unsaturated alkyl having 1–4 carbon atoms; X is selected from the group consisting of $H_2$, oxygen and $H(R_8)$, where $R_8$ is selected from the group consisting of hydroxy and acetoxy; and a double bond is present starting from carbon atom 5.

2. An 11,11-alkylidene steroid of the formula:

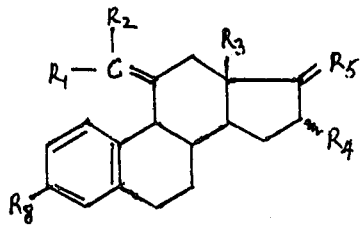

wherein $R_1$ and $R_2$ are selected from the group consisting of hydrogen and methyl; $R_3$ is methyl; $R_4$ is selected from the group consisting of hydrogen and hydroxy; $R_5$ is selected from the group consisting of oxygen, $\alpha H$ ($\beta$ OH) and $\alpha R_7$ ($\beta$ OH), wherein $R_7$ is saturated or unsaturated alkyl having 1–4 carbon atoms; and $R_8$ is selected from the group consisting of hydroxy and methoxy.

3. An 11,11-alkylidene steroid of the formula:

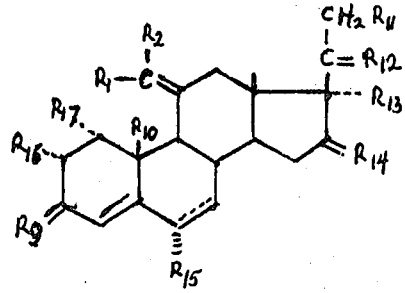

wherein $R_1$ and $R_2$ are selected from the group consisting of hydrogen and methyl; $R_9$ and $R_{12}$ are selected from the group consisting of oxygen and $H(R_{8a})$, wherein $R_{8a}$ is selected from the group consisting of hydroxy and acetoxy; $R_{10}$ is selected from the group consisting of hydrogen and methyl, $R_{11}$ is selected from the group consisting of hydrogen, fluoro, hydroxy and acylated hydroxy, the acyl group of which has been derived from a saturated or unsaturated organic carboxylic acid having 1–18 carbon atoms; $R_{13}$ is selected from the group consisting of hydrogen, methyl hydroxy and acylated hydroxy, the acyl group of which has been derived from a saturated or unsaturated organic carboxylic acid having 1–18 carbon atoms with the proviso that when $R_{13}$ is not hydrogen, $R_{11}$ is hydrogen; $R_{14}$ is selected from the group consisting of $H_2$, $H(alkyl)$, the alkyl group of which has 1–4 carbon atoms, and methylene; $R_{15}$ is selected from the group consisting of hydrogen, methyl and chloro; $R_{16}$ and $R_{17}$ are hydrogen or together form a methylene group with the proviso that when $R_{16}$ and $R_{17}$ are not hydrogen, $R_{11}$, $R_{13}$, $R_{14}$ and $R_{15}$ are hydrogen; and a double bond may be present between carbon atoms 6 and 7.

* * * * *

UNITED STATES PATENT AND TRADEMARK OFFICE

CERTIFICATE EXTENDING PATENT TERM
UNDER 35 U.S.C. § 156

PATENT NO.: 3,927,046

DATED: December 16, 1975

INVENTOR(S): Albertus Joannes van den Broek

PATENT OWNER: Akzona Incorporated

This is to certify that there has been presented to the

COMMISSIONER OF PATENTS AND TRADEMARKS an application under 35 U.S.C. § 156 for an extension of the patent term. Since it appears that the requirements of the law have been met, this certificate extends the term of the patent for the period of

1,069 DAYS with all rights pertaining thereto as provided by 35 U.S.C. § 156(b).

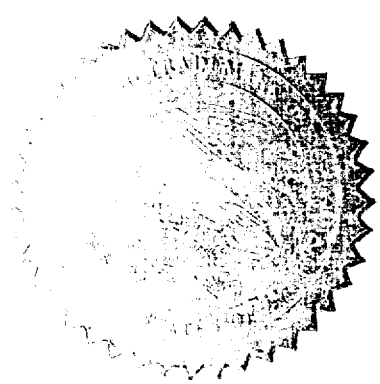

I have caused the seal of the Patent and Trademark Office to be affixed this 6th day of December 1993.

Bruce A. Lehman
Assistant Secretary of Commerce and
Commissioner of Patents and Trademarks